United States Patent [19]

Davis

[11] 3,737,949

[45] June 12, 1973

[54] METHOD AND APPARATUS FOR PROCESSING HIDES

[76] Inventor: Albert D. Davis, 117 E. 21st Street, Spencer, Iowa 51301

[22] Filed: Jan. 25, 1971

[21] Appl. No.: 109,339

[52] U.S. Cl. .................................... 17/21, 17/50
[51] Int. Cl. .............................................. A22b 5/16
[58] Field of Search ................................ 17/21, 50

[56] References Cited

UNITED STATES PATENTS

| 2,770,006 | 11/1956 | Wilkens | 17/21 |
| 3,483,590 | 12/1969 | Balasch et al. | 17/21 |
| 3,588,947 | 6/1971 | Devlin et al. | 17/21 |

FOREIGN PATENTS OR APPLICATIONS

| 1,352,552 | 1/1964 | France | 17/21 |

Primary Examiner—Lucie H. Laudenslager
Attorney—J. Warren Kinney, Jr.

[57] ABSTRACT

A beef carcass suspended at the hind legs from a moving conveyor, is prepared for hide removal by means of a deep rumping operation performed by hand which frees the tail and provides at each side of the carcass a hide flap. The underside of the hide is slitted down to the forequarters and head, and a pocket is formed at the top of the loin to free the tail and prevent the fat in this region from being pulled off as the hide is stripped from the pack, sides, forelegs, and head in one continuous rapid operation, the head remaining on the carcass.

The stripping involves initially feeding the tail of an animal between two closely moving surfaces which grip progressively the tail, the hind leg flaps, the shoulder portions of the hide, and finally the foreleg and head portions, the stripping continuing uninterruptedly until the head remaining on the carcass is finally bared of hide.

23 Claims, 9 Drawing Figures

INVENTOR
ALBERT D. DAVIS

INVENTOR
ALBERT D. DAVIS

BY *J. Warren Kinney Jr.*
ATTORNEY

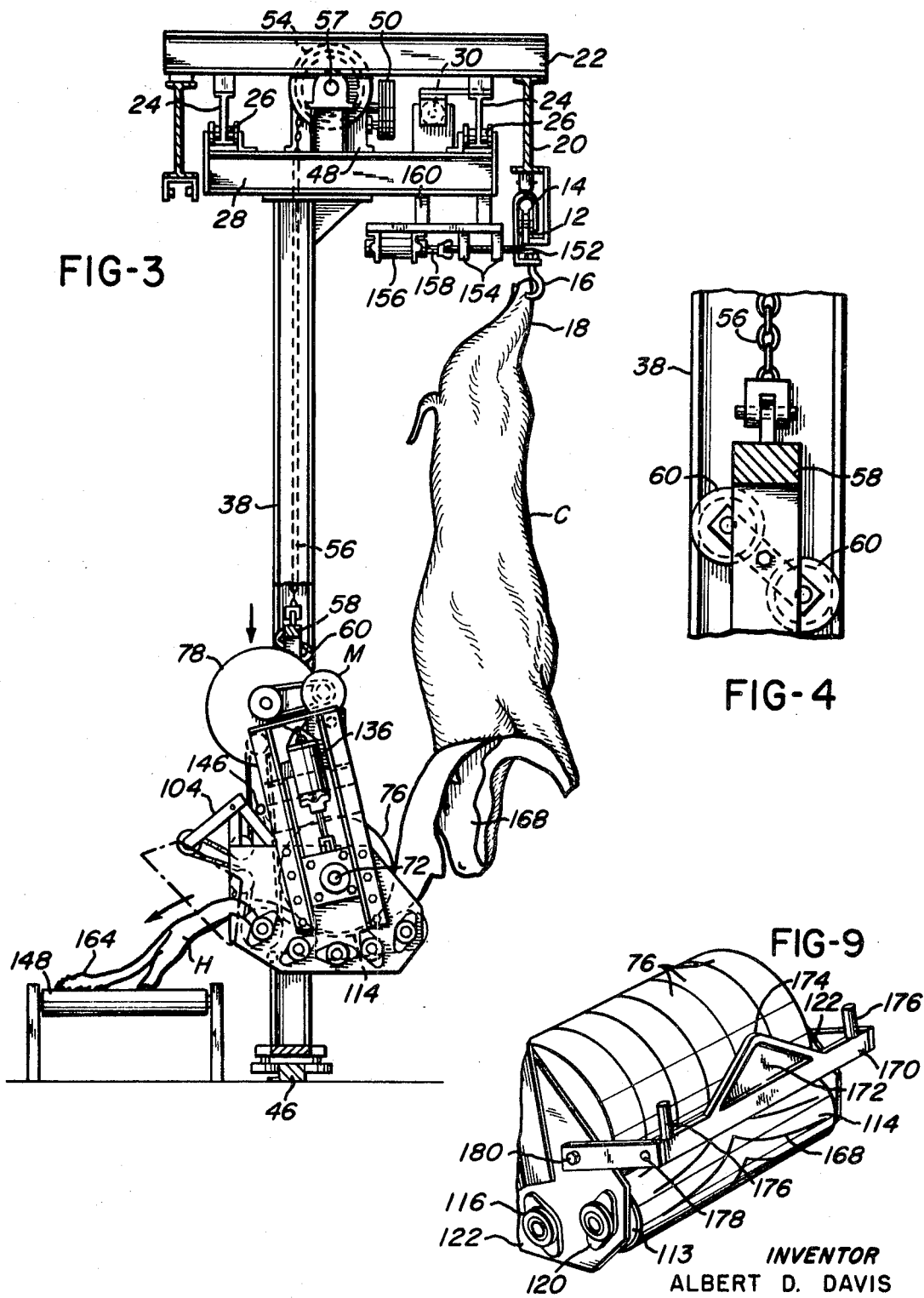

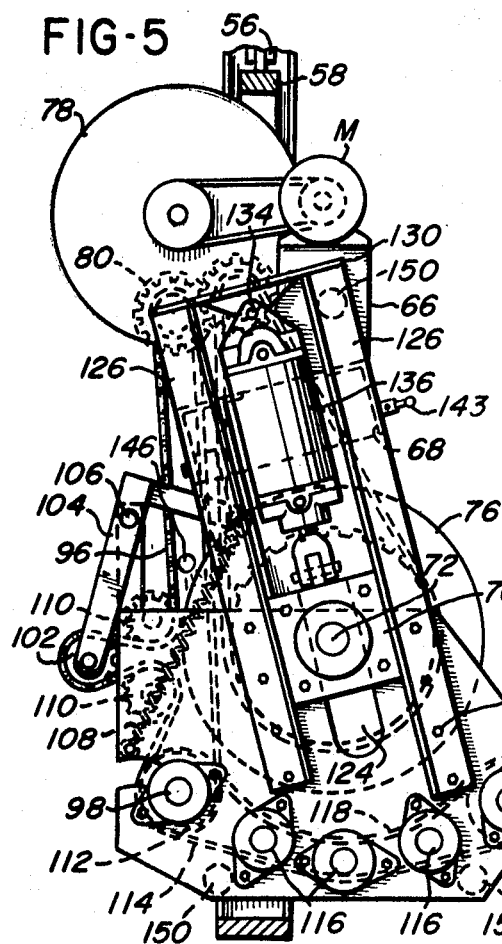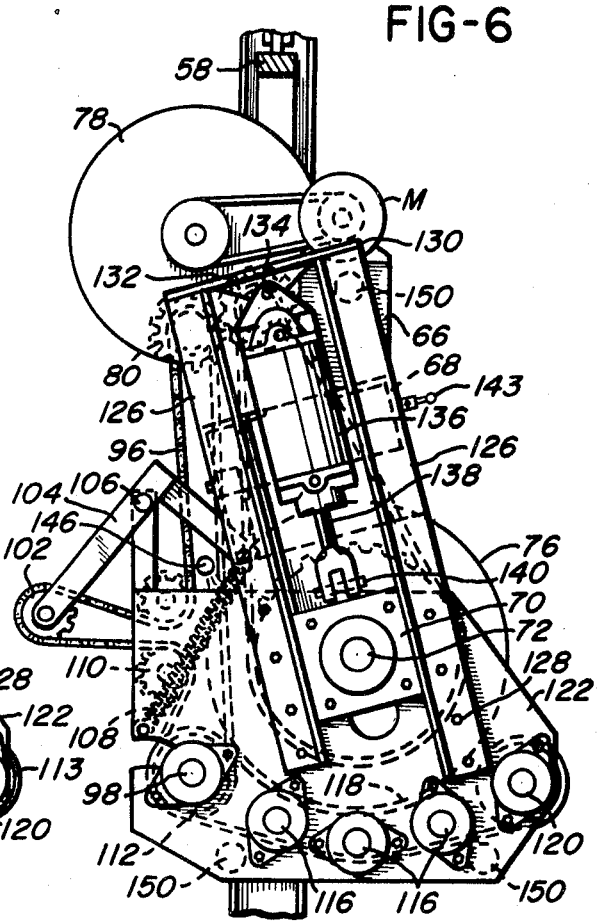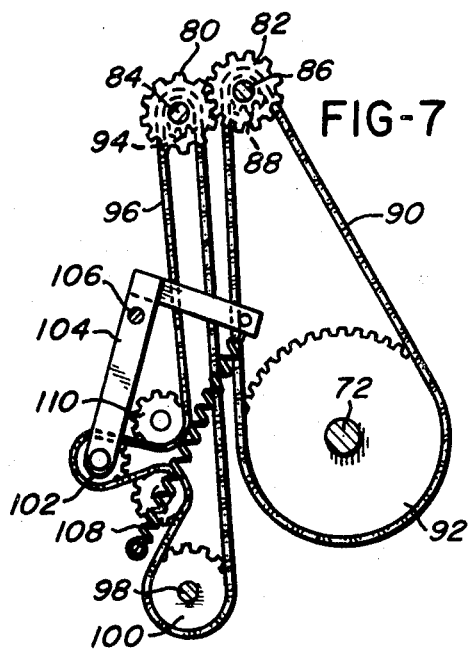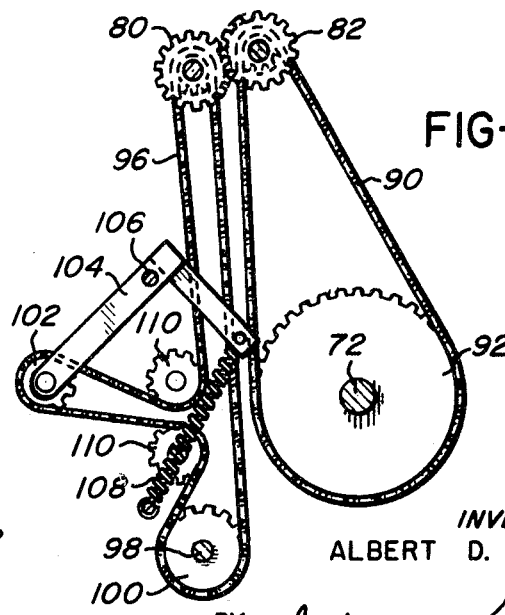

METHOD AND APPARATUS FOR PROCESSING HIDES

BACKGROUND OF THE INVENTION

To a limited extent, proposals have been advanced heretofore to automate the removal of hides from beef and other animals, in the hope of minimizing expensive hand labor, and overcoming interruptions in the continuous line production of meat. The efforts of the past have proven only partly successful, however, due in large measure to the failure of prior machines to consistently maintain a coordinated working arrangement with other timed components of the complete system of operations. The prior machines were slow and usually did not deep pace with the carcass conveyor through sustained periods of time.

The hide pullers of the past were not designed to remove with effectiveness the hide of the animal head. The prior devices objectionably stretched the entire hide in pulling it from the carcass, this resulting in the production of many thin hides and wasteful tearing thereof. Moreover, the common use of hide grippers in the hide pulling operation objectionably marked, punctured, or tore the hides unless the operation was accompanied by considerable manual assistance, which involved added expense.

SUMMARY OF THE INVENTION

In accordance with the pr-sent invention, there is provided a carriage which may be caused to advance a limited distance with the constantly moving carcass conveyor, this advancement being under the control of an operator or attendant who rides upon the carriage. The carriage while advancing may also be lowered vertically by the operator, relative to a carcass suspended by its hind legs from the conveyor.

The carriage supports a frame which includes a pair of wringer elements rotating in opposite directions, and between which the operator initially inserts the tail of the animal. Beginning with the tail, the hide progressively enters the wringer and is stripped from the carcass until finally the head, which remains on the carcass, is neatly and completely stripped of hide without manual aid. The entire stripping operation is performed while the carriage and the carcass advance continuously a distance of about six feet in the direction of carcass advancement, while at the same time the wringer elements are lowered progressively to a location beyond the head of the suspended animal. A complete cycle of operation of the apparatus may require about 20 seconds during which time the actual stripping of hide from the carcass may be performed in about 5 seconds, under normal operating conditions.

An object of the present invention is to provide a method and apparatus capable of removing with timed precision, the hides of meat animals which are suspended by the hind legs from a continuously advancing conveyor of a meat processing plant operating on a continuous high-production basis, with a minimum of manual labor involved in the process.

Another object of the invention is to provide in apparatus of the character mentioned, simple, reliable, and effective means for rapidly stripping the hides from carcasses, including the hide from the heads of the animals, without objectionably stretching, marking, or puncturing the hides to impair their value.

Another object is to provide a highly efficient high-capacity hide pulling apparatus of the character stated, which requires the services of but one attendant, and which delivers hides and carcasses in a clean, sanitary condition without manual handling.

A further object of the invention is to provide a hide removal method and apparatus so designed as to keep pace with other high-speed operations in the continuous processing of meat in large packing plants.

The foregoing and other objects are attained by the means described herein and illustrated in the accompanying drawings.

DETAILED DESCRIPTION OF THE INVENTION

In the drawings:

FIG. 3 is a view similar to FIG. 2, showing a final phase of the hide stripping operation begun in FIG. 2.

FIG. 4 is an enlarged cross-section taken on line 4—4 of FIG. 1, and detailing a carriage suspension means shown immediately above the carriage in FIG. 3.

FIG. 5 is an enlarged view of the FIG. 3 carriage, showing wringer means thereof in a separated inoperative position.

FIG. 6 is a view similar to FIG. 5, showing the wringer means in closed operative position.

Figure 1:
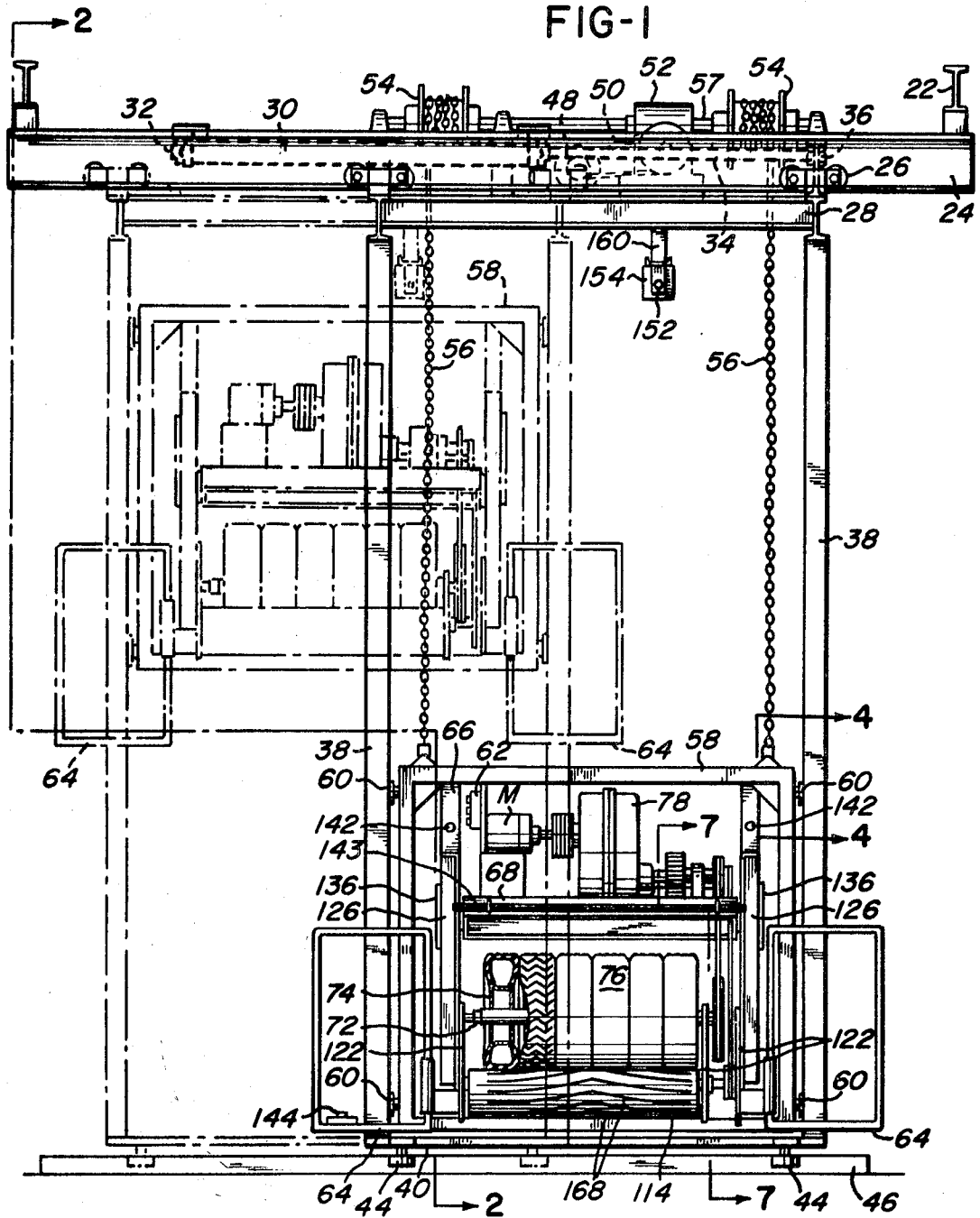
FIG. 1 is a front elevation of the apparatus of the present invention, shown with its carriage in a full-line lowered position at which a hide is stripped from a carcass, and in a broken line elevated position at which the hide stripping is initiated.

FIGS. 7 and 8 are views showing in full lines the drive trains of FIGS. 5 and 6, respectively, these views being taken on line 7—7 of FIG. 1.

FIG. 9 is a detail perspective view of a modification.

Figure 2:
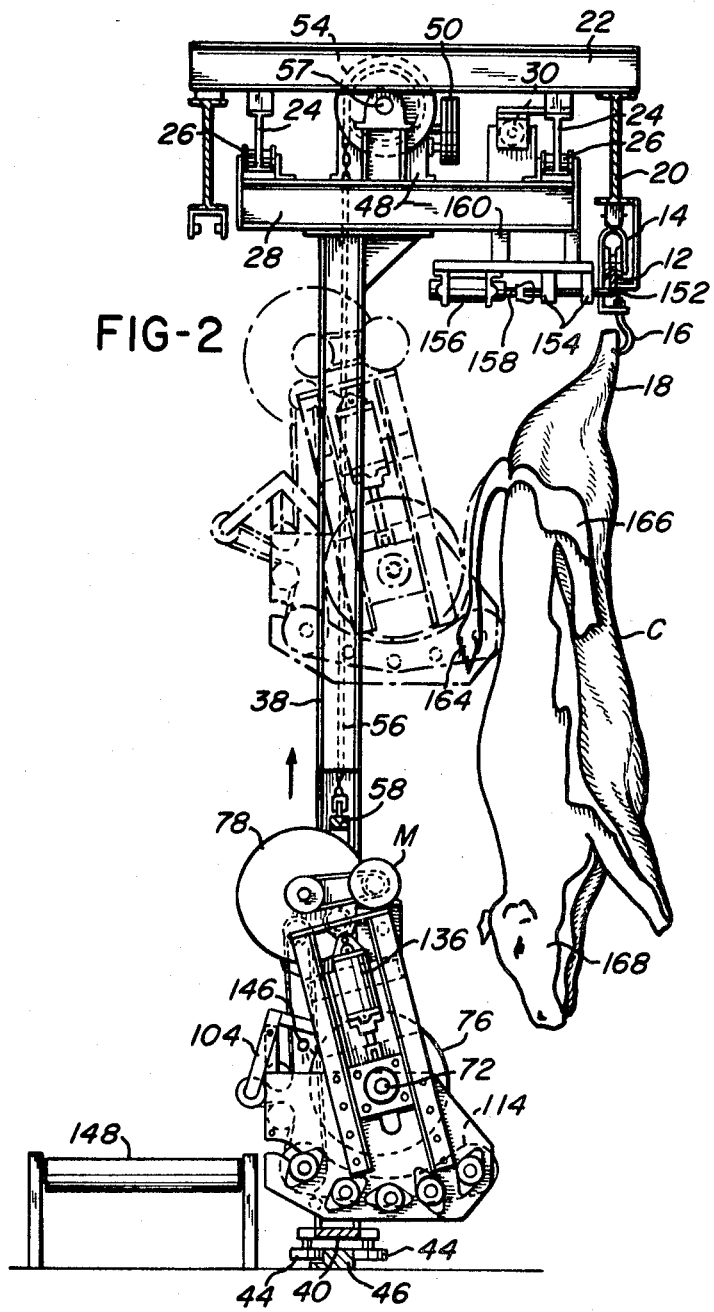
FIG. 2 is an end view taken on line 2—2 of FIG. 1, and to which has been added a carcass conveyor shown in operative relationship to the stripping apparatus.

Referring to FIGS. 1 and 2, a conventional endless conveyor 12 includes the usual succession of wheeled trolleys 14 each carrying a pair of pointed hooks 16 spaced from one another and adapted to suspend a carcass C by its hind legs 18. The trolleys of conveyor 12 normally advance carcasses continuously past a succession of stations at which various operations are performed in dressing the carcasses. One of such stations is the hide removing or hide pulling station, with which the present invention is concerned.

The conveyor and its trolleys may be suspended from a suitable superstructure which includes I-beams such as 20 and 22, in accordance with common practice.

Arranged in spaced parallelism with the I-beam or conveyor support 20, is a pair of stationary I-beams or track sections 24, 24, the lower flanges of which support the rollers 26 of a carriage 28 which is movable lengthwise along the track sections. Such movement of the carriage is limited, and in most cases may approximate five feet. A pneumatic cylinder motor 30 may be employed to move the carriage in a manner to be explained later, said cylinder having a base 32 fixed to a beam 24, and a piston 34 having one end fixed to carriage 28 at 36.

Carriage 28 includes a pair of spaced parallel upright track members 38, 38 which may be in the form of channel irons rigidly joined together at their lower ends by a horizontal strut 40. Strut 40 may carry a plurality of rollers or guide elements 44 to embrace a fixed floor rail 46, whereby the carriage is maintained in a fixed plane while traveling along the overhead track members 24, 24, the floor rail being parallel to said track members.

The head portion of carriage 28 supports thereon a reversible electric motor 48 having a belt drive 50 to a speed reducer 52, which reducer through shaft 57 drives a pair of pulleys 54, 54. Hoisting chains or cables 56, 56 are trained over the pulleys 54, and depend therefrom to suspend a shiftable frame 58 guided vertically by the channel members 38, 38. Rollers 60 carried by frame 58 serve to smoothly guide the frame in its movements between elevated and lowered positions as suggested by broken lines and full lines in FIG. 1. Such movements are under the control of the reversible electric motor 52, which in turn may be controlled by means of manual push-button electric switches carried by a control unit 62 within the reach of an attendant standing upon one of the platforms 64.

The platforms move substantially with frame 58 to the elevated and lowered positions shown. The attendant will use only one of the platforms 64, this depending upon whether he is right-handed or left-handed. Controls available to the attendant may be installed at either or both of the platforms, as may be convenient.

The shiftable elevator frame 58, as best illustrated by FIG. 1, may be substantially rectangular of form. Said frame carries a pair of fixed upright sub-frame members 66 spaced apart (FIG. 1), and connected by a rigid substantially horizontal bridge member 68. Each of members 66 carries also one of a pair of journal blocks 70 to rotatably support the opposite ends of a wheel shaft 72 upon which shaft is fixed a plurality of roll forming members, such as, by way of example, automobile wheels 74 carrying anti-skid deep tread pneumatic rubber tires 76.

In the disclosure of FIG. 1, six wheels and tires as above mentioned are shown by way of example, with the understanding that all of the tires and their treads may be alike, by preference. The shaft 72 and the rubber-tired wheels thereon are adapted for rotation as a unit.

Upon the stationary bridge member 68 may be mounted an electric motor M driving a speed reducer 78 and a train of gears including a pair of intermeshed spur gears 80, 82 fixed upon shafts 84, 86. One of said shafts is driven by speed reducer 78, causing gears 80, 82 to rotate said shafts in opposite directions and at equal speeds.

Shaft 86, through a sprocket 88 and chain 90, (FIG. 7), drives a sprocket 92 affixed to shaft 72 which carries the rubber-tired wheels 74. The second shaft 84 carries a sprocket 94 driving an endless chain 96, the primary purpose of which is to rotate a lower shaft 98 through the agency of a sprocket 100 fixed upon shaft 98. A compensating means to maintain chain 96 in taut condition may be provided, as exemplified in FIG. 7. Such means may comprise a shiftable sprocket 102 rotatably mounted upon one arm of a bell crank 104 which is pivoted at 106 for rocking movement against the force of a tension spring 108. The spring tends constantly to draw the chain taut between idler sprockets 110, 110 as will be understood.

The shaft 98 driven by chain 96, carries an elongate roller 112 fixed thereon, and trained over said roller 112 and a similar roller 113 is a wide endless belt 114. The width of belt 114 approximates the span of all the tires 76 on shaft 72.

The upper and lower reaches of belt 114 overlie and underlie a series of horizontal idler rollers 116 disposed intermediate the rollers 112 and 113. The axes of the several rollers describe an arc of a circle, approximately, so that the upper reach of belt 114 forms substantially a concave cradle as shown at 118, FIG. 5. The belt 114 is driven by chain 96 at a surface speed equal to that of tires 76, the shafts 72 and 120 rotating in opposite directions.

The opposite ends of the several rollers 112, 113, and 116 are journaled for rotation in bearings carried by a pair of spaced parallel journal plates 122, 122. Each of said plates plates is slotted as at 124 to permit upward and downward shifting of shaft 72 relative thereto. Each plate 122 is fixed, as by means of bolts 128, to a pair of angularly inclined, spaced parallel lift bars 126, 126, preferably in the form of angle irons as shown, fixedly secured relative to frame 58, 66. At their upper ends, the bars of each pair may be rigidly connected together by a strut 130 having a bracket 132 formed thereon.

At the middle point of each bracket 132, a pivot 134 mounts thereon one end of a fluid motor or hydraulic cylinder 136 whose piston 138 is connected at 140 to a journal block 70. Since as before stated, said journal blocks 70 are shiftable relative to frame 58 and sub-frame 66, any outward projection of piston rods 138 against the journal blocks will result in lowering the journal blocks, the shaft 72, and tires 76. The tires when so lowered, will press firmly though resiliently against the upper reach of belt 114, as suggested by FIGS. 3 and 6. Conversely, a retractile movement of piston rods 138 will result in elevating the wheel and tire unit to the position of FIGS. 2 and 5.

The aforesaid actuation of fluid motors or cylinders 136, 136, to lower the wheel and tire unit, may be initiated by manually actuating either one of two air valves 142 conveniently located on elevator frame 58. Located on the floor of one of the platforms 64 (FIG. 1), so as to be foot operated, is an electric switch 144 to control the motor M. A hand-operated actuator bar 143 rockably mounted on frame member 68, may actuate suitable means (not shown) to initiate retraction of the piston rods to elevate the wheel and tire unit from contact with the belt 114. The nature and arrangement of switches and fluid control valves for achieving the aforesaid hydraulic cylinder actuations are well known in the art, wherefore the present disclosure need not be burdened with a detailed description thereof.

It may here be noted that the chain tensioning means 104, 108 of FIGS. 7 and 8, compensate for changes of distance between sprockets 94 and 100 resulting from the hydraulic elevating and lowering of the wheel and tire unit. At 146, FIGS. 5 and 6, is indicated a transverse spray pipe which directs a spray of water continuously, or at intervals if desired, upon the tires 76 to ensure cleanliness of the tires and belt 114, and to prevent hides from adhering thereto during and upon termination of the stripping operation of FIG. 3. The hides H removed or stripped from the carcasses may be deposited without manual handling upon a conveyor 148 or other receiver of hides, and disposed of in accordance with usual practice.

In FIGS. 5 and 6, the reference numerals 150 indicate spacer bars for maintaining the opposing side journal plates 122 of the belt unit in spaced parallelism with one another. The spacer bars at the upper end of said unit rigidify and space also the pairs of guide bars 126, 126.

Referring now to FIGS. 1 and 2, there is provided at 152 a reciprocable interceptor or interlock preferably in the form of a sliding pin or rod 152, which may be projected selectively by an attendant into the path of advancement of a trolley 14 carrying a carcass C. The interceptor 152 may be slidable in bearing means 154 fixed to carriage 28, and may be shifted in any approved manner to and from operative and inoperative positions with respect to the trolleys of conveyor 12. Thus, projection of the interceptor 152 into the path of advancement of a trolley 14 will effect interlocking with the moving trolley to enforce advancement of carriage 28 therewith along the track sections 24, 24.

The means for shifting the interceptor is herein shown, by way of example only, as a double-acting pneumatic cylinder 156 whose piston rod 158 is attached to one end of the interceptor. A rigid hanger or support means 160 may be utilized to suspend the interceptor mechanism from carriage 28. Advancement and retraction of the pneumatic cylinder piston rod may be conveniently performed by means of electric pushbuttons at the control unit 62 (FIG. 1), while the attendant rides upon the adjacent platform 64. The electrical means and fluid valves necessary for the operation, are well within the skill and knowledge of persons conversant with machine controls.

From the foregoing, it should be understood that an attendant riding upon a platform 64 may conveniently manipulate the controls at unit 62, to connect the carriage 28 with, or disconnect it from, the moving conveyor 12. The carriage therefore may be moved, with conveyor 12, from the broken line position of FIG. 1 horizontally to the full line position shown, along rails 24 and 46. A limit switch, not shown, may be provided to automatically initiate retraction of interceptor 152 if and when carriage 28 reaches the end of rail 24, or some predetermined location thereon.

Carriage 28 may be returned to the initial or starting position indicated by broken lines on FIG. 1, by the action of pneumatic carriage-return cylinder 30. Cylinder 30 may be pushbutton controlled by the attendant at unit 62, for return of the carriage to the starting position. It is not necessary in most cases, to employ the power of cylinder 30 for advancing the carriage with conveyor 12, particularly if the conveyor is adequately powered for towing the carriage.

The attendant standing on platform 64 has access also to the control devices 142 and 143, for controlling, raising and lowering of tires 76 relative to belt 114. In the normal operation of the apparatus, the tires remain in resilient contact with the belt; however, the operator may quickly disengage these elements one from the other should such action become necessary or desirable. Disengagement may be required in the event of an emergency, such as for example, entry of some part of the attendant's clothing or possibly entry of the animal's nose between the moving elements. The attendant also may control the starting and stopping of driving motor M, at control switch 144.

The group of tires 76 may properly be referred to as a rotatable cylindrical member of the apparatus, as distinguished from the reaction means comprising the moving belt 114. It may be noted also that the reaction means and its counterpart 76 serve as a wringer to remove water from the hides; and if desired, the apparatus may be used as a wringer alone, when not in use as a stripper.

OPERATION OF THE APPARATUS

The carcass suspended from moving conveyor trolley 14 requires preliminary preparation in advance of reaching the hide removal station. That is, the carcass is subjected to a deep rumping operation performed by hand, which involves forming a pocket at the top of the loin by means of an air knife, to free the tail 164 and prevent the fat in this region from being pulled off as the hide is stripped from the carcass. This hand operation also involves slitting the underside of the hide lengthwise to the forequarter and head, and providing flaps of hide 166 at opposite sides of the carcass, substantially in accordance with FIG. 2.

The carcass as above prepared will be carried by trolley to the stripping station, where the apparatus of the present invention will have its carriage elevated and disposed in the starting position indicated by broken lines in FIG. 1. An attendant standing on a platform 64 will press a pushbutton at 144, to start motor M and thereby activate the rotatable cylindrical member 76 and reaction means or belt 114. Also, the air control valve 142 will be actuated to ensure contact between the elements 76 and 114.

The attendant then grasps the tail 164 and inserts it into the throat between the moving elements 76 and 114, about midway between the side edges of element or belt 114. As the tail enters, it is followed by the hide flaps 166, 166, which lie flatwise upon the belt at opposite sides of the tail, with the hair side contacting the upper reach of the belt. Cleats or angularly disposed chevron-shaped ribs 168 formed on the working face of belt 114 serve to guide and spread the flaps over the face of the belt. An auxiliary guide and spreader for the hides may be provided in accordance with FIG. 9, wherein 170 indicates a transverse horizontal bar disposed forwardly of belt 114, said bar carrying a smooth triangular guide plate 172 with an apex 174 thereof directed upwardly midway between the journal plates 122, 122. The sloping edges at opposite sides of apex 174 serve to spread the hides across the width of belt 114. Upstanding posts 176, 176 located near the ends of bar 170 prevent spreading of hides beyond the side edges of the belt. Bar 170 may be adjusted rotationally at screw 178, and the elevation thereof may be adjusted at the arm-securing screw 180.

As the tail and flaps 166 rapidly enter the constricted throat, the hide is pulled from the hindquarter area and the attendant then presses the proper pushbutton at control unit 62, to initiate lowering of frame 58 by means of motor 48. The stripping frame finally will reach a lowered position, such as at FIG. 3, where the hide is about to be stripped from the head of the carcass. Here the throat between the presser elements 76 and 114 is disposed at a lower elevation than the head 168, and continued pulling readily strips the hide therefrom, leaving the head otherwise intact.

As the hide leaves the carcass head, it passes on to receiver 148 automatically without manual handling. Thereupon, the attendant may press the proper pushbuttons at control unit 62, to retract interlock 152 and return the carriage 28 to the initial starting position illustrated by broken lines in FIG. 1, with frame 58 elevated in readiness for a subsequent hide-stripping operation.

It is important to note that pulling of the hide is performed at a location always quite close to the carcass, thereby to minimize lengthwise stretching of the hide. By this procedure the quality and thickness of the hide is preserved, and the likelihood of thinning or tearing is effectively prevented. The quality, appearance, and usefulness of the hides are enhanced also by reason of the fact that no grippers are employed capable of puncturing or marking the hides.

The present apparatus constitutes the cleanest most sanitary hide removal system known to the industry. It is also the fastest, and most efficient, with a rate of several hundred beef per hour, and requiring the services of but one attendant. The removal of heads after hide removal is very advantageous, in that it saves time and labor, and enables the meat-cutter to leave a maximum amount of flesh on the carcass incident to head removal.

What is claimed is:

1. Apparatus for removing the hide from a carcass suspended by its hind legs from the moving trolley of a packing house conveyor rail, the carcass being prepared in advance by slitting the underside of the hide lengthwise from the tail to the lower jaw approximately, providing rump flaps, and freeing the tail hide from the tail flesh, said apparatus comprising in combination: an elevator frame carrying a rotatable means and a reaction means including press surfaces traveling at substantially equal speeds in a direction laterally away from the backbone of the suspended carcass; spreader means on one of the rotatable means and reaction means for spreading the hide laterally outwardly for flatwise entry between the press surfaces; an entry throat between said press surfaces adapted to grasp and draw between said surfaces the inserted tail of a suspended carcass, followed by peeling off the rump flaps, the back portion, the shoulder portion, the neck portion, and the head and face portions of the hide off the suspended carcass, with transfer of the removed hide to a location remote from the carcass; and means operative during the hide removal operation, for advancing the frame at the approximate speed of the trolley advancement, and lowering said frame progressively as the hide peels from the carcass.

2. Apparatus as defined by claim 1, wherein is included means for temporarily interlocking the frame with a trolley, to advance the frame while the hide is peeled from the carcass.

3. Apparatus as defined in claim 1, wherein the reaction means includes said spreaders means for minimizing folds in the hides while passing between the press surfaces of the rotatable means and the reaction means.

4. Apparatus as defined by claim 1, wherein the rotatable means comprises a series of wheels fixed side by side upon a supporting shaft; and an automotive pneumatic tire on each wheel for resiliently engaging the press surface of the reaction means.

5. Apparatus as defined by claim 4, wherein said tires carry treads embossed to enhance the gripping function thereof upon the hides.

6. Apparatus as defined by claim 5, wherein hides are fed to the peripheral portions of said tires with the flesh sides of the hides contacting said treads.

7. Apparatus as defined by claim 6, wherein is included means for spraying a liquid upon the treads.

8. Apparatus as defined by claim 7, wherein the liquid of the spray is predominately water.

9. Apparatus as defined by claim 1, wherein the reaction means comprises an endless belt trained about a pair of support rollers, one reach of said belt constituting one of the press surfaces aforesaid.

10. Apparatus as defined by claim 9, wherein is included means intermediate said support rollers, for imparting to said one reach of the belt an arcuate configuration; and said rotatable means is substantially cylindrical of form having a periphery with an arcuacy closely complementary to the arcuate configuration of said one belt reach.

11. Apparatus as defined by claim 10, wherein the rotatable means comprises a series of wheels arranged side by side upon a supporting shaft; and an automotive pneumatic tire on each wheel for resiliently engaging said one reach of the belt.

12. Apparatus as defined by claim 11, wherein is included means placing under the control of an attendant the speed of lowering of said frame.

13. Apparatus as defined by claim 12, wherein is included means under the control of an attendant for temporarily interlocking the frame with a trolley, to ensure advancement of the frame with the trolley while the hide is peeled from the carcass.

14. Apparatus as defined by claim 13, wherein the rotatable means comprises a series of wheels arranged side by side upon a supporting shaft; and an automotive pneumatic tire on each wheel for resiliently engaging the press surface of said reaction means.

15. Apparatus as defined by claim 14, wherein the reaction means comprises an endless belt trained about a pair of support rollers, one reach of said belt constituting one of the press surfaces aforesaid.

16. Apparatus as defined by claim 15, wherein is included means intermediate said support rollers, for imparting to said one reach of the belt an arcuate cradle configuration; and said rotatable means is substantially cylindrical of form having a periphery with an arcuacy closely complementary to the arcuate configuration of said one belt reach.

17. Apparatus as defined by claim 1, wherein is included means under the control of an operator for selectively interlocking the frame with a trolley, to ensure advancement of the frame with trolley while the hide is peeled from the carcass.

18. Apparatus as defined by claim 1, wherein is included a shiftable carriage supporting said frame; an overhead track means of limited length disposed in spaced substantial parallelism with said conveyor rail; means for guiding the carriage along said track means between a starting position and a finish position; and upright track means attached to and movable with said carriage, for guiding the elevator frame to and from the lowered position aforesaid.

19. Apparatus as defined by claim 18, wherein is included means for temporarily interlocking the carriage with a moving trolley, to advance the carriage and frame with the trolley while the hide is peeled from the carcass.

20. Apparatus as defined by claim 18, wherein is included means for spraying a rinsing liquid onto the press surface of the rotatable means.

21. Apparatus as defined by claim 18, wherein said means operative to lower said frame is under the control of an attendant.

22. Apparatus as defined by claim 18, wherein the rotatable means comprises a series of wheels arranged side by side upon a supporting shaft; and an automotive pneumatic tire on each wheel for resiliently engaging the press surface of said reaction means.

23. Apparatus as defined by claim 18, wherein the reaction means comprises an endless belt trained about a pair of support rollers, one reach of said belt constituting the press surface of said reaction means.

* * * * *